United States Patent
De Carvalho, Jr. et al.

(10) Patent No.: US 12,174,912 B2
(45) Date of Patent: *Dec. 24, 2024

(54) QUANTUM COMPUTATION FOR COST OPTIMIZATION PROBLEMS

(71) Applicant: Accenture Global Solutions Limited, Dublin (IE)

(72) Inventors: Jair Antunes De Carvalho, Jr., São Paulo (BR); Rodrigo Morimoto Suguiura, São Paulo (BR); Shreyas Ramesh, Mountainside, NJ (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,567

(22) Filed: Apr. 17, 2023

(65) Prior Publication Data

US 2024/0119115 A1    Apr. 11, 2024

Related U.S. Application Data

(63) Continuation of application No. 16/900,222, filed on Jun. 12, 2020, now Pat. No. 11,663,291.

(51) Int. Cl.
*G06F 17/17* (2006.01)
*G01C 21/34* (2006.01)
(Continued)

(52) U.S. Cl.
CPC .......... *G06F 17/17* (2013.01); *G01C 21/343* (2013.01); *G06N 10/00* (2019.01); *G06N 10/60* (2022.01); *G06Q 10/047* (2013.01)

(58) Field of Classification Search
CPC ...... G06F 17/17; G01C 21/343; G06N 10/00; G06N 10/60; G06Q 10/047
(Continued)

(56) References Cited

U.S. PATENT DOCUMENTS 10,268,964 B2   4/2019   Changiz Rezaei et al.
10,846,448 B1   11/2020  Pikus et al.
(Continued)

OTHER PUBLICATIONS

Bauckhage et al., "Towards Shortest Paths via Adiabatic Quantum Computing," Presented at Proceedings of the 14th International Workshop Mining and Learning with Graphs, Aug. 2018, London, UK, 6 pages.
(Continued)

*Primary Examiner* — James C Kerveros
(74) *Attorney, Agent, or Firm* — Polsinelli PC

(57) ABSTRACT

Methods, systems, and apparatus for solving cost optimization problems. In one aspect, a method includes receiving data representing a cost optimization problem in a network, wherein i) the network is represented as a graph of nodes and edges, and ii) each edge comprises an associated cost; mapping the data representing the cost optimization problem in a network to a quadratic unconstrained binary optimization (QUBO) formulation of the cost optimization problem, the QUBO formulation comprising multiple variables with values determined by states of respective qubits, wherein each qubit corresponds to a respective edge of the graph of nodes and edges; obtaining data representing a solution to the cost optimization problem from a quantum computing resource; and initiating an action based on the obtained data representing a solution to the cost optimization problem.

20 Claims, 5 Drawing Sheets

(51) Int. Cl.
*G06N 10/00* (2022.01)
*G06N 10/60* (2022.01)
*G06Q 10/047* (2023.01)

(58) Field of Classification Search
USPC .......................................................... 708/444
See application file for complete search history.

(56) References Cited

U.S. PATENT DOCUMENTS

| | | | |
|---|---|---|---|
| 11,663,291 | B2 | 5/2023 | Carvalho, Jr. et al. |
| 2017/0286852 | A1 | 10/2017 | Rezaie et al. |
| 2020/0118025 | A1* | 4/2020 | Romero ................. G06N 3/088 |
| 2020/0234172 | A1 | 7/2020 | King et al. |
| 2020/0278903 | A1* | 9/2020 | Fowler ................... G06N 10/70 |
| 2020/0349509 | A1 | 11/2020 | Sharma et al. |
| 2021/0173660 | A1* | 6/2021 | Hogaboam ........... G06F 9/3851 |
| 2021/0279260 | A1 | 9/2021 | Oberoi et al. |
| 2021/0286603 | A1* | 9/2021 | Baughman ............. G06N 3/065 |
| 2021/0334079 | A1 | 10/2021 | Gambetta et al. |
| 2021/0390159 | A1 | 12/2021 | De Carvalho, Jr. et al. |

OTHER PUBLICATIONS

Bellman, "On A Routing Problem," Quart. Appl. Math., 1958, 16(1):87-90.
Dijkstra, "A Note on Two Problems in Connexion with Graphs," Numerische Mathematik, Dec. 1959, 1(1):269-271.
EP Extended Search Report in European Appln. No. 21169750.3, dated Oct. 22, 2021, 9 pages.
Feld et al., "A Hybrid Solution Method for the Capacitated Vehicle Routing Problem Using a Quantum Annealer," arXiv, Jun. 14, 2019, arXiv:1811.07403v2, 19 pages.
Ford et al., "Flows in Networks," Princeton University Press, 1962, 203 pages.
Office Action for EP Patent Application No. 21169750.3, dated Jun. 25, 2024, 9 pages.

* cited by examiner

QUANTUM COMPUTATION FOR COST OPTIMIZATION PROBLEMS

CROSS-REFERENCE TO RELATED APPLICATION

This application is a continuation of U.S. application Ser. No. 16/900,222, filed Jun. 12, 2020, and titled "Quantum Computation for Cost Optimization Problems," which is incorporated by reference.

TECHNICAL FIELD

The present invention relates to quantum computing.

BACKGROUND

Example cost optimization problems include shortest path problems. A shortest path problem is the problem of finding a path between two nodes in a graph such that the sum of the weights of its constituent edges is optimized.

Shortest path problems appear in freight and logistical chain planning, where the nodes in a graph represent physical locations and the shortest path is a path between the physical locations where the sum of the distances between the physical locations is minimized; networking or telecommunications, where the nodes in a graph represent network devices such as routers and the shortest path is a path between the network devices where the sum of the bandwidth between the network devices is maximized; plant and facility layout; robotics; and VLSI design. Algorithms for solving shortest path problems include the Bellman-Ford algorithm and Dijkstra's algorithm.

SUMMARY

This specification describes methods and systems for calculating shortest paths using quantum computation.

In general, one innovative aspect of the subject matter described in this specification can be implemented in a method that includes receiving data representing a cost optimization problem in a network, wherein i) the network is represented as a graph of nodes and edges, and ii) each edge comprises an associated cost; mapping the data representing the cost optimization problem in a network to a quadratic unconstrained binary optimization (QUBO) formulation of the cost optimization problem, the QUBO formulation comprising multiple variables with values determined by states of respective qubits, wherein each qubit corresponds to a respective edge of the graph of nodes and edges; obtaining data representing a solution to the cost optimization problem from a quantum computing resource; and initiating an action based on the obtained data representing a solution to the cost optimization problem.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the data representing a solution to the cost optimization problem comprises data representing a low energy configuration of states of the respective qubits, wherein the low energy configuration of the states of the respective qubits represents a low cost path in the graph of nodes and edges.

In some implementations the low energy configuration of the states of the respective qubits comprise qubits in a 1 state and qubits in a 0 state, wherein the low cost path comprises edges corresponding to the qubits in a 1 state.

In some implementations the cost optimization problem comprises determining a path between an initial node and an end node in the graph such that a sum of the associated costs of the constituent edges is minimized.

In some implementations the received data representing a cost optimization problem in a network comprises data representing a first set of nodes, wherein the first set of nodes comprises an initial node for the path and an end node for the path.

In some implementations the method further comprises generating first constraints for the cost optimization, wherein the first constraints specify that, in a determined path, both the initial node and the end node comprise one incident edge.

In some implementations the QUBO formulation of the cost optimization problem further comprises a Hamiltonian function represented by a matrix, and wherein mapping the data representing the cost optimization problem in a network to a QUBO formulation of the cost optimization problem comprises mapping the first constraint to the Hamiltonian function represented by a matrix, comprising, for each node in the first set of nodes: identifying edges in the graph that are connected to the node; populating entries of the matrix that correspond to the identified edges, the populating comprising: adding $-2k$ to diagonal entries of the matrix that correspond to the identified edges, wherein k represents a positive real number; adding $4k$ to upper diagonal entries of the matrix that correspond to pairs of the identified edges; and adding zero to lower diagonal entries of the matrix.

In some implementations the received data representing a cost optimization problem in a network comprises data representing a second set of nodes, wherein the second set of nodes comprises mandatory nodes for the path.

In some implementations the method further comprises generating a second constraint for the cost optimization, wherein the second constraint i) specifies that, in a determined path, each mandatory node comprises two incident edges, and ii) penalizes candidate paths that do not include nodes in the second set of nodes.

In some implementations the QUBO formulation of the cost optimization problem further comprises a Hamiltonian function represented by a matrix, and wherein mapping the data representing the cost optimization problem in a network to a QUBO formulation of the cost optimization problem comprises mapping the second constraint to the Hamiltonian function represented by a matrix, comprising, for each node in the second set of nodes: identifying edges in the graph that are connected to the node; populating entries of the matrix that correspond to the identified edges, the populating comprising: adding $-6k$ to diagonal entries of the matrix that correspond to the identified edges, where k represents a positive real number; adding $4k$ to upper diagonal entries of the matrix that correspond to pairs of the identified edges; and adding zero to lower diagonal entries of the matrix.

In some implementations the received data representing a cost optimization problem in a network comprises data representing a third set of nodes, wherein the third set of nodes comprise prohibited nodes for the path.

In some implementations the method further comprises generating a third constraint for the cost optimization, wherein the third constraint i) specifies that, in a determined path, each prohibited node comprises zero incident edges, and ii) penalizes candidate paths that include nodes in the third set of nodes.

In some implementations the QUBO formulation of the cost optimization problem further comprises a Hamiltonian function represented by a matrix, and wherein mapping the data representing the cost optimization problem in a network to a QUBO formulation of the cost optimization problem comprises mapping the third constraint to the Hamiltonian function represented by a matrix, comprising, for each node in the third set of nodes: identifying edges in the graph that are connected to the node; populating entries of the matrix that correspond to the identified edges, the populating comprising: adding 2k to diagonal entries of the matrix that correspond to the identified edges, where k represents a positive real number; and adding zero to other entries of the matrix.

In some implementations the received data representing a cost optimization problem in a network comprises data representing a fourth set of nodes, wherein the fourth set of nodes comprise nodes to be removed from the graph.

In some implementations the method further comprises generating a fourth constraint for the cost optimization, wherein the fourth constraint removes the nodes in the fourth set of nodes from candidate paths.

In some implementations the received data representing a cost optimization problem in a network comprises data representing the received data representing a cost optimization problem in a network comprises data representing: a first set of nodes, wherein the first set of nodes comprises an initial node for the path and an end node for the path, a second set of nodes, wherein the second set of nodes comprises mandatory nodes for the path, a third set of nodes, wherein the third set of nodes comprise prohibited nodes for the path, and a fourth set of nodes, wherein the fourth set of nodes comprise nodes to be removed from the graph.

In some implementations the method further comprises generating a fifth constraint for the cost optimization, wherein the fifth constraint specifies that, in a determined path, each node in a fifth set of nodes comprising a complement of a union of the first, second, third and fourth sets of nodes comprises zero or two incident edges.

In some implementations the QUBO formulation of the cost optimization problem further comprises a Hamiltonian function represented by a matrix, and wherein mapping the data representing the cost optimization problem in a network to a QUBO formulation of the cost optimization problem comprises: introducing an additional auxiliary qubit; mapping the fifth constraint to the Hamiltonian function represented by a matrix, comprising, for each node in the fifth set of nodes: identifying edges in the graph that are connected to the node; populating entries of the matrix that correspond to the identified edges, the populating comprising: adding 2k to diagonal entries of the matrix that correspond to the identified edges, where k represents a positive real number; adding 4k to upper diagonal entries of the matrix that correspond to pairs of the identified edges, adding zero to lower diagonal entries of the matrix; adding 8k to a diagonal entry of the matrix that corresponds to the auxiliary qubit; and adding −8k to entries in a column and row corresponding to the auxiliary qubit and the identified edges.

In some implementations the quantum computing resource comprises a quantum annealer.

In some implementations initiating an action based on the obtained data representing a solution to the cost optimization problem comprises initiating distribution of goods according to a route specified by the solution to the cost optimization problem.

The subject matter described in this specification can be implemented in particular ways so as to realize one or more of the following advantages. Cost optimization systems that utilize quantum computing resources, as described in this specification, can more quickly obtain solutions to cost optimization problems compared to cost optimization systems that use only classical computing resources.

For example, the time complexity of the Bellman Ford algorithm is $O(|V|\cdot|E|)$ where $|V|$ and $|E|$ represent the number of graph vertices and edges, respectively. The time complexity of Dijkstra's Algorithm is $O(V^2)$. Both algorithms are costly, particularly as the size of the graph increases.

However, by formulating the cost optimization problem as a QUBO problem using the techniques described in this specification, the cost optimization problem can be provided to a quantum computing resource that has the processing capabilities to efficiently solve the cost optimization problem in a time that is independent of the size of the problem, e.g., as fast as qubit decay time which can be of the order of µs.

Because of this increase in efficiency, cost optimization problems can be updated and solved in real time. This can be particularly advantageous in dynamic applications such as freight and logistic planning, where problem parameters and the conditions under which a transportation route is to be completed can often change or be updated. In addition, because of this increase efficiency, highly complex problems can be solved exactly without the use of heuristics that typically reduce the complexity of the problem and therefore produce solutions with lower accuracy.

In addition, the presently described techniques support the inclusion of additional problem constraints such as maximum acceptable delivery time in a problem of freight cost optimization, and therefore can provide accurate, optimal solutions to specific cost optimization problems.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for solving cost optimization problems using quantum computation. Input data for a cost optimization problem can be used to define a graph of nodes and edges, where each edge has an associated cost. The cost optimization problem can then be formulated as the problem of determining a path in the graph with a lowest associated cost. The cost optimization problem is mapped to a QUBO formulation. Mapping the cost optimization problem to a QUBO formulation includes associating each edge in the graph with a respective qubit whose state corresponds to a value of a respective QUBO variable. Mapping the cost optimization problem to a QUBO formulation further includes embedding the input data for the cost optimization problem, e.g., problem constraints, into a QUBO Hamiltonian function. The QUBO formulation can be accepted by a quantum computing resource, and a solution to the cost optimization problem can be obtained from the quantum computing resource.

The presently described techniques can be widely applied to various cost optimization problems, e.g., shortest path problems, minimization of cambial spread or other applications where an optimization of state transitions is needed. However, for convenience and without loss of generality, the presently described techniques are primarily described in the context of determining a shortest path between multiple physical locations in logistics and freight planning.

Figure 1:
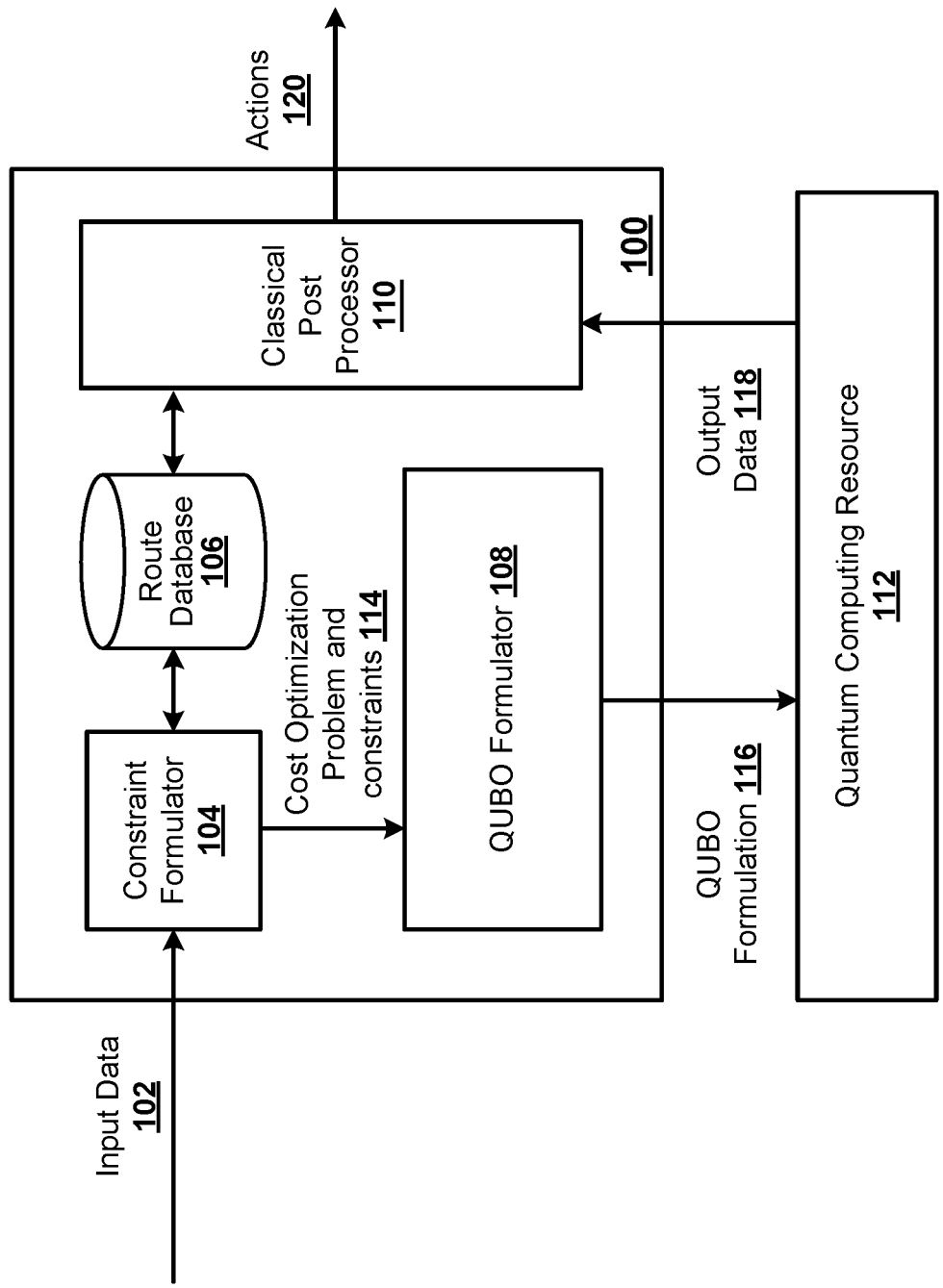
FIG. 1 shows an example system for solving cost optimization problems.

FIG. 1 depicts an example system 100 for solving cost optimization problems. The system 100 is an example of a system implemented as computer programs on one or more classical or quantum computing devices in one or more locations, in which the systems, components, and techniques described below can be implemented.

The system 100 includes a constraint formulator 104, a route database 106, a QUBO formulator 108, a classical post-processor 110, and a quantum computing resource 112. The quantum computing resource 112 is shown as being external to the system 100. However in some implementations the system 100 may include the quantum computing resource 112. Components of the system 100 may be in data communication with the quantum computing resource 112, e.g., through a communication network such as a local area network or wide area network.

The system 100 is configured to receive as input data associated with a cost optimization problem, e.g., input data 102. For example, in some cases the cost optimization problem may be the problem of determining a shortest path for a transportation route. In these examples the input data 102 may include data specifying that a shortest path between multiple trading post names or identifiers is required. The input data 102 can further list the multiple trading post names or identifiers. Some of the trading post names or identifiers may be labelled as particular types of trading posts. For example, one trading post identifier included in the input data 102 may be labelled as an initial trading post, i.e., a starting point for the transportation route. Another trading post identifier included in the input data 102 may be labeled as an end trading post, i.e., a end point for the transportation route. Some trading posts included in the input data may be labelled as mandatory trading posts, i.e., trading posts that should be included in the transportation route. Some trading posts included in the input data may be labelled as prohibited trading posts, i.e., trading posts that should not be included in the transportation route.

The system 100 is configured to determine a solution to the cost optimization problem represented by the input data 102. To determine a solution to the cost optimization problem, the system 100 uses one or more of the constraint formulator 104, the QUBO formulator 108 or the classical post processor 110.

The constraint formulator 104 is configured to receive the input data 102 and to process the received input data to determine data representing the cost optimization problem and problem constraints 114, e.g., an objective function for the cost optimization problem.

To determine the data 114, the constraint formulator 104 can access the route database 106 to construct a graph of nodes and edges for the cost optimization problem. For example, the constraint formulator 104 can access the route database 106 to determine possible roads, sea lanes or flight paths between the multiple trading post names or identifiers included in the input data. The constraint formulator 104 can then construct a graph of nodes and edges for the cost optimization problem, where each node represents a respective trading post and each edge represents a road, sea lane or flight path between respective trading posts. In some cases the constraint formulator 104 can include nodes in the graph that do not correspond to trading posts included in the input data 102. For example, the constraint formulator 104 may include trading posts that are located on a road, sea lane or flight path that connects two trading posts included in the input data 102. Each edge in the graph constructed by the constraint formulator 104 can have an associated cost. For example, the cost associated with each edge can correspond to a physical distance between two trading posts represented by two nodes connected by the edge.

The constraint formulator 104 can further generate one or more constraints to be included in the data 114. For example, as described above, the input data 102 may list multiple trading post names or identifiers, where some of the trading posts are labelled as particular types of trading posts. The constraint formulator 104 can use this information to generate the one or more constraints. For example, the constraint formulator 104 can generate constraints that increase the likelihood that a shortest path output by the system 100 includes a correct start trading post and end trading post. As another example, the constraint formulator 104 can generate constraints that increase the likelihood that trading posts labelled as mandatory are included in a shortest path output by the system 100. Example operations performed by the constraint formulator 104 when processing received input data 102 are described in detail below with reference to FIG. 2.

The constraint formulator 104 is configured to provide generated data specifying a cost optimization problem and problem constraints 114 represented by the input data 102 to the QUBO formulator 108. The QUBO formulator 108 is configured to map the data specifying a cost optimization problem and problem constraints 114 to a quadratic unconstrained binary optimization (QUBO) formulation 116 of the cost optimization problem. To map the data specifying a cost optimization problem and problem constraints 114 to a QUBO formulation 116, the QUBO formulator 108 maps some of the data 114 to QUBO variables that take binary values determined by states of respective qubits, where each qubit corresponds to a respective edge of the graph of nodes and edges constructed by the constraint formulator 104. The QUBO formulator 108 further maps some of the data 114 to a QUBO Hamiltonian function represented by a matrix. Example operations performed by the QUBO formulator 108 are described below with reference to FIG. 2.

The system 100 is configured to transmit data representing the QUBO formulation 116 of the cost optimization problem represented by the input data 102 to the quantum computing resource 112.

In some implementations the quantum computing resource 112 may be a quantum annealer. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

Quantum annealer devices can solve problems if they are formulated in an acceptable format. For example, quantum annealer devices can solve some QUBO formulations of problems by mapping the QUBO formulation into a qubit network of a quantum annealer device.

In other implementations the quantum computing resources may be a quantum gate processors. A quantum gate processor includes one or more quantum circuits, i.e., models for quantum computation in which a computation is performed using a sequence of quantum logic gates, operating on a number of qubits (quantum bits). Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to directly performing the corresponding adiabatic quantum annealing process using a quantum annealer device, since not all quantum annealer devices can realize physical quantum systems that represent an optimization problem. For example, some quantum annealer devices may not provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The quantum computing resource 112 processes the received data to generate output data 118 representing a solution to the cost optimization problem.
The quantum computing resource is configured to provide the generated output data 118 to the system 100, e.g., to the classical post processor 110.

The system 100 is configured to receive the output data 118 from the quantum computing resource 112. The classical post-processor 110 is configured to process the received output data 118. Processing the output data 118 may include extracting the solution to the cost optimization problem from the output data 118 and determining one or more actions to be taken based on the solution to the cost optimization problem. For example, the classical post-processor 110 can generate step by step directions for an optimal transportation route represented by the output data 118. Alternatively or in addition, the classical post-processor 110 can generate a map that shows the optimal transportation route.

The system 100 is configured to output data representing determined actions that can be taken 120. For example, the system 100 may provide the data 120 to, or include, a broker that initiates actions based on the output data. For example, the system can initiate distribution of goods according to an optimal transportation route represented by the output data 118, e.g., by transmitting data representing generated directions or a map of the optimal transportation route to a navigation system of a transportation vehicle.

Figure 2:
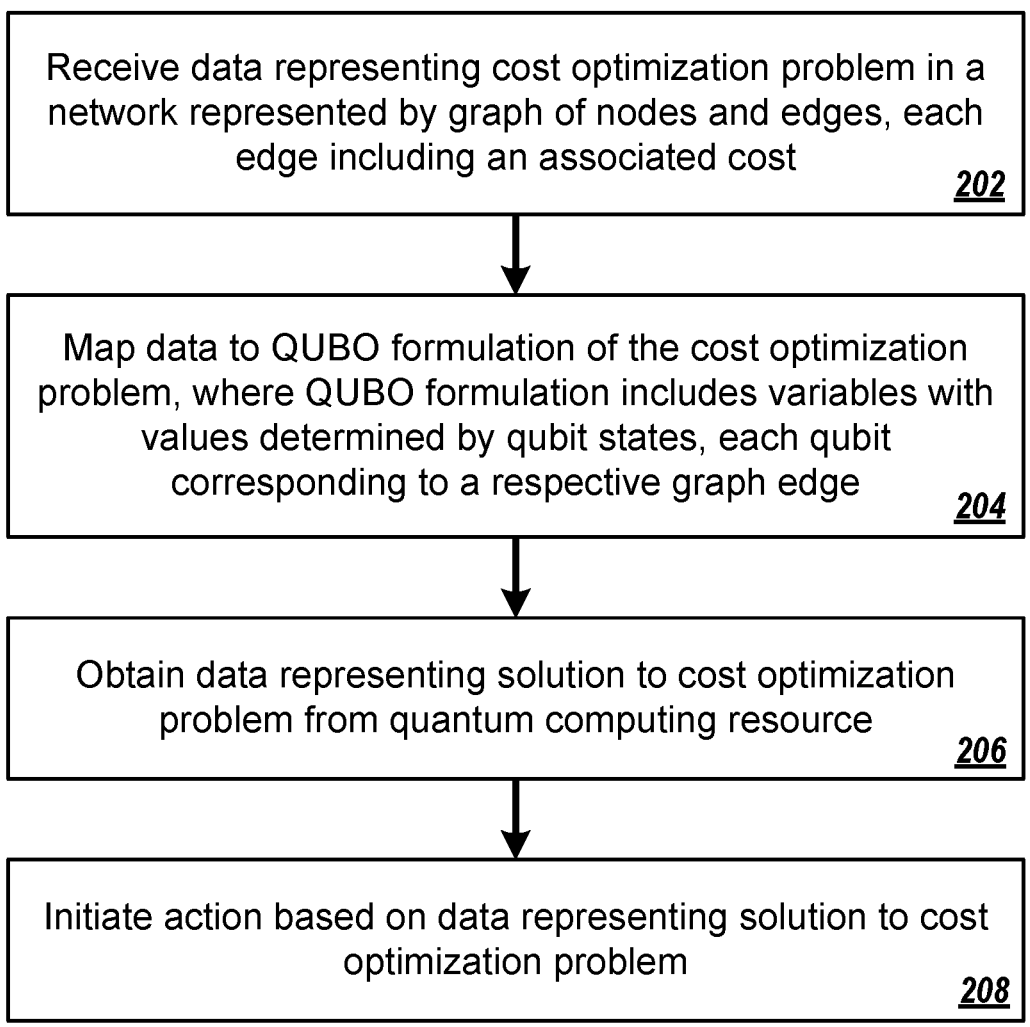
FIG. 2 is a flow diagram of an example process for solving a cost optimization problem using quantum computing resources.

FIG. 2 is a flowchart of an example process 200 for solving a cost optimization problem using quantum computing resources. For convenience, the process 200 will be described as being performed by a system of one or more classical or quantum computing devices located in one or more locations. For example, example system 100 of FIG. 1, appropriately programmed in accordance with this specification, can perform the process 200.

The system receives data representing a cost optimization problem in a network (step 202). As described in more detail below with reference to FIGS. 3A-3C, in some implementations the system may receive data representing a cost optimization problem in a network through a GUI. For example, a user may input data defining a cost optimization problem using the GUI.

The network can be represented as a graph of nodes and edges, where each edge has an associated cost. For example, each node may represent a physical location and each edge may represent a road, sea lane or flight path connecting two physical locations. Each edge can have an associated physical distance between the two physical locations, e.g., as measured by the length of the road, sea lane or flight path. As described in more detail below, each edge can also be associated with a binary variable whose value can be represented by a respective qubit.

In some implementations the cost optimization problem may be the problem of determining a path between an initial node and an end node in the graph such that a sum of the associated costs of the constituent edges is minimized (referred to hereafter as an "optimal path".) For example, the cost optimization problem may be the problem of determining a shortest path between an initial node and an end node. In these implementations the received data can include data representing a first set of nodes S in the graph, where the first set of nodes includes an initial node for the optimal path and an end node for the optimal path. For example, the initial node may represent a fixed starting location for a transport route and the end node may represent a fixed destination location for the transport route.

Optionally, the received data can further include data representing a second set of nodes M, where the second set of nodes include mandatory nodes for the path. Mandatory nodes are nodes that should be included in an optimal path (or equivalently, nodes that penalize candidate paths that do not include the nodes). For example, the mandatory nodes may represent locations that should be visited before the destination location is reached. In some cases nodes in the second set of nodes can have an associated weight which indicates how important it is that the node is included in an optimal path. For example, it may be essential that some mandatory nodes are included in an optimal path, and preferable but not essential that other mandatory nodes are included in an optimal path.

Optionally, the received data can further include data representing a third set of nodes P, where the third set of nodes include prohibited nodes for the path. Prohibited nodes are nodes that do not need to be included in an optimal path (or equivalently, nodes that penalize candidate paths that include the nodes). For example, the prohibited nodes may represent locations that do not have to be visited before the destination location is reached, but can be included in an optimal path if the overall gain in cost resulting from including the node is large enough.

Optionally, the received data can further include data representing a fourth set of nodes Re, where the fourth set of nodes include nodes to be removed from the graph. Nodes to be removed from the graph are nodes that must not be included in an optimal path. For example, the nodes to be removed from the graph may correspond to physical locations which are currently not possible to visit, e.g., due to a border, road, sea lane or flight path closure, or which are dangerous to visit, e.g., due to current extreme weather.

Graph nodes that are not in the first, second, third, and fourth sets S, P, M or Re can form a fifth set of nodes.

The system can use the received data to generate one or more constraints for the cost optimization problem. In cases where each node in the graph of nodes and edges has been assigned to one set of nodes, as described above, the system can generate one constraint for each node.

For example, the system can generate first constraints which specify that the initial node of an optimal path and the end node of an optimal path should each only have one incident edge. Accordingly, the sum of the binary representations of all edges incident to the initial node and the end node should be equal to 1, that is $$\forall y_i \in S, \Sigma x_k = 1 \text{ where } k \text{ represents all edges connected to } y_i.$$

The first constraints penalize candidate paths that return to the initial node or end node, e.g., candidate paths that leave the initial node at the beginning of the path and pass through the initial node again before reaching the end node.

The system can also generate second constraints which i) specify that each mandatory node included in an optimal path includes two incident edges, and ii) penalize candidate paths that do not include the mandatory nodes. In other words, each mandatory node should be passed through and therefore have at exactly two incident edges. Accordingly, the sum of the binary representations of all edges incident to each mandatory node should therefore be equal to 2, that is $$\forall y_i \in M, \Sigma x_k = 2 \text{ where } k \text{ represents all edges connected to } y_i.$$

The second constraints penalize candidate paths that do not visit a mandatory node (i.e., mandatory nodes with zero incident edges), penalize candidate paths that treat a mandatory node as an initial or end node (i.e., mandatory nodes with an odd number of incident edges), and penalize candidate paths that return multiple times to a same mandatory node (i.e., mandatory nodes with an even number of incident edges that is greater than 2.)

The system can also generate third constraints which i) specify that each prohibited node included in an optimal path includes zero incident edges, and ii) penalize candidate paths that include prohibited nodes. In other words, each prohibited node should not be passed through and therefore have no incident edges. Accordingly, the sum of the binary representations of all edges incident to each prohibited node should therefore be equal to zero, that is $$\forall y_i \in P, \Sigma x_k = 0 \text{ where } k \text{ represents all edges connected to } y_i.$$

The third constraints penalize candidate paths that visit a prohibited node any number of times.

The system can also generate a fourth constraint that removes nodes to be removed from the graph, e.g., so that the nodes cannot be included in an optimal path. That is $$\forall y_i \in Re, \text{ remove } y_i \text{ from the graph}$$

Unlike the third constraints, where candidate paths that include prohibited nodes are penalized but not forbidden, the fourth constraint ensures that a removed node is not included in an optimal path. This is particularly important in cases where a node is removed due to security or safety reasons, as described above.

The system can also generate fifth constraints which specify that each node in the fifth set of nodes (nodes in the complement of the union of S, P, M and Re) which is included in an optimal path includes zero or two incident edges. In other words, each other node should either not be included in an optimal path (in which case the sum of the binary representations of all edges incident to the other node is equal to zero) or should be a node that the path passes through (in which case the sum of the binary representations of all edges incident to the other node is equal to two.) That is $$\forall y_i \notin S, M, P, Re, \Sigma x_k = 0 \text{ or } 2 \text{ where } k \text{ represents all edges connected to } y_i$$

The fifth constraints allow for other "non-essential" nodes to be included in an optimal path if the overall gain in cost resulting from including the node is large enough, and penalizes the inclusion of other nodes in an optimal path if the other node acts as an initial or end node (i.e., other nodes with an odd number of incident edges) or if an optimal path returns multiple times to a same other node (i.e., other nodes with an even number of incident edges that is greater than 2.)

In some cases the system can receive or generate additional cost optimization problem constraints. For example, in cases where the cost optimization problem is a shortest path problem for a transportation route, the system can receive data specifying a maximum acceptable delivery time or maximum transportation vehicle capacities. Such constraints can be included in the cost optimization problem by adding a corresponding constraint term to an objective function for the cost optimization problem. Alternatively or in addition, such constraints can be included in the cost optimization problem by adjusting one or more of the above described sets of nodes based on the constraint. For example, some mandatory nodes may be removed from the second set of nodes if a total amount of goods to be collected by a transportation vehicle (in a route where no goods are dropped off) exceeds the transportation vehicle's capacity.

Once the system generates the corresponding constraints, the system can determine a cost optimization problem objective function defined as $$\Sigma C_j + \Sigma (x_i * w_i) \tag{1}$$

where $w_i$ represents the cost associated with the edge $x_i$, and $\Sigma C_j$ represents the generated constraints. In some implementations the $\Sigma C_j$ may be a weighted sum, e.g., some constraints $C_j$ may be weighted more or less than others. The weights can be adjusted to increase the probability that a solution to the cost optimization problem satisfies the corresponding constraints, e.g., increase the probability that a particular node is included in a generated route. For example, as described above, a constraint corresponding to a first mandatory node may have a higher weight than a constraint corresponding to a second mandatory node if a user specifies that it is more important for a calculated route to include first mandatory node compared to the second node.

The system maps the data representing the cost optimization problem to a QUBO formulation of the cost optimization problem (step 204). The QUBO formulation includes multiple variables $x_i$ with values determined by states of respective qubits. As described above with reference to step 202, each qubit corresponds to a respective edge of the graph of nodes and edges that represents the network. The QUBO formulation also includes a Hamiltonian function represented by a matrix Q. For example, the QUBO formulation of the cost optimization problem objective function can be expressed as $$E(x|Q) = \sum_{i \leq j}^{n} x_i Q_{i,j} x_j \quad (2)$$

where n represents the total number of qubits (or, equivalently, the total number of edges in the graph representing the network.)

To map the data representing the cost optimization problem to a QUBO formulation of the cost optimization problem, the system maps the constraints described above with reference to step 202 to the QUBO formulation. That is, the system embeds the constraints into the matrix Q.

For example, the system can embed the first constraints in the matrix Q by, for each node in the first set of nodes, identifying edges in the graph that are connected to the node in the first set of nodes and populating entries of the matrix Q that correspond to the identified edges. Populating entries of the matrix Q that correspond to edges in the graph that are connected to a particular node in the first set of nodes can include adding $-2k$ to diagonal entries of the matrix that correspond to the identified edges, where k represents a positive real number, adding 4k to upper diagonal entries of the matrix that correspond to pairs of the identified edges, and adding 0 to lower diagonal entries of the matrix. That is, for a particular node y E S, the system can populate entries of the matrix Q according to $\{Q_{i,i}=-2k\},\{Q_{i,j}=4k,i\neq j,i>j\},\{Q_{i,j}=0,i\neq j,i<j,k\in R_*^+\}$.

where the indices i, j represent edges connected to the particular node y.

Under this matrix population procedure, when a node from the first set of nodes is in an optimal path and has exactly 1 incident edge (as is the case for the initial node and the end node) there is exactly one diagonal $Q_{i,i}$ contribution of magnitude $-2k$ and no off diagonal $Q_{i,j}$ contributions of magnitude 4k. This means the overall result of the QUBO sum given by Equation (2) is $-2k$. Since k is defined to be a positive real number, $-2k$ is negative. If a node from the first set of nodes is included in an optimal path and has 2 incident edges, there are 2 different $Q_{i,i}$ contributions each with magnitude $-2k$, and exactly one $Q_{i,j}$ contribution with magnitude 4k. The overall result of the QUBO sum is then $-2k+(-2k)+4k=0$ (larger than the previous case.) The sum will increase for nodes from the first set of nodes with increasing numbers of incident edges, e.g., for 3 incident edges there are 3 $Q_{i,j}$ contributions which produces a sum of $-2k+(-2k)+(-2k)+4k+4k+4k=6k$. Therefore, the minimum attainable result is $-2k$, which corresponds to the ideal case that a node from the first set of nodes has one incident edge.

Solving the QUBO formulation of the optimization problem (using a quantum computer) produces a lowest energy quantum state. Due to the formulation of the generated first constraints and the presently described mapping of the first constraints to the QUBO formulation, the lowest energy quantum state is the state corresponding to the result $-2k$, which in turn corresponds to the initial node and end node each having exactly one incident edge.

The system can embed the second constraints in the matrix Q by, for each node in the second set of nodes, identifying edges in the graph that are connected to the node in the second set of nodes and populating entries of the matrix Q that correspond to the identified edges. Populating entries of the matrix Q that correspond to edges in the graph that are connected to a particular node in the second set of nodes can include adding $-6k$ to diagonal entries of the matrix that correspond to the identified edges, where k represents a positive real number, adding 4k to upper diagonal entries of the matrix that correspond to pairs of the identified edges, and adding zero to lower diagonal entries of the matrix. That is, for a particular node y∈ M, the system can populate entries of the matrix Q according to $\{Q_{i,i}=-6k\},\{Q_{i,j}=4k,i\neq j,i>j\},\{Q_{i,j}=0,i\neq j,i<j\},k\in R_*^+$ where the indices i, j represent edges connected to the particular node y.

The second constraint specifies that mandatory nodes in an optimal path should each have 2 incident edges. This is achieved by the above described embedding of the second constraints in the QUBO formulation because the overall result of the QUBO sum given by Equation (2) for nodes with zero incident edges is zero. For nodes with exactly 1 incident edge the overall sum is $-6k$ (from one $Q_{i,i}$ contribution and no $Q_{i,j}$ contribution.) For nodes with exactly two incident edges the overall sum is $-6k+(-6k)+4k=-8k$ (two $Q_{i,i}$ contributions and one $Q_{i,j}$ contribution). For nodes with exactly three incident edges the overall sum is $-6k+(-6k)+(-6k)+4k+4k+4k=-6k$, and for nodes with four and more incident edges the result becomes larger. That is, the smallest value is obtained for nodes with exactly two incident edges.

The system can embed the third constraint in the matrix Q by, for each node in the third set of nodes, identifying edges in the graph that are connected to the node in the third set of nodes and populating entries of the matrix Q that correspond to the identified edges. Populating entries of the matrix Q that correspond to edges in the graph that are connected to a particular node in the third set of nodes can include adding 2k to diagonal entries of the matrix that correspond to the identified edges, where k represents a positive real number, and adding zero to other entries of the matrix. That is, for a particular node y E P the system can populate entries of the matrix Q according to $\{Q_{i,i}=2k\},\{Q_{i,j}=0 i\neq j\},k\in R_*^+$.

where the indices i, j represent edges connected to the particular node y.

Prohibited nodes should not be included in an optimal path. This is achieved by the above described specific embedding of the third and fourth constraints to the QUBO formulation because each edge incident to a prohibited or removed node adds 2k, so no edge achieves a zero or negative value.

The system may not embed the fourth constraint in the matrix Q, since each node in the fourth set of nodes are nodes that must not be included in an optimal path. The nodes are therefore removed from the graph and are not included in the QUBO formulation.

To embed the fifth constraints in the matrix Q, the system introduces an additional auxiliary qubit (an n+1 th qubit.) Then, for each node in the fifth set of nodes, the system identifies edges in the graph that are connected to the node in the fifth set of nodes and populates entries of the matrix Q that correspond to the identified edges. Populating entries of the matrix Q that correspond to edges in the graph that are connected to a particular node in the fifth set of nodes can include adding 2k to diagonal entries of the matrix that correspond to the identified edges, where k represents a positive real number, adding 4k to upper diagonal entries of the matrix that correspond to pairs of the identified edges, adding zero to lower diagonal entries of the matrix, adding 8k to the diagonal entry of the matrix that corresponds to the auxiliary qubit, and adding $-8k$ to entries of the column and row that correspond to the auxiliary qubit and the identified edges. That is, for a particular node y S, M, P, Re, the system can populate entries of the matrix Q according to $$\{Q_{i,j}=2k\},\{Q_{i,j}=4k\ i\neq j,i>j\},\{Q_{i,j}=0\ \text{for}\ i\neq j\ \text{and}\ i<j\},$$
$$\{Q_{n+1,n+1}=8k\},\{Q_{i,n+1}=-8k,i\neq n+1\},k\in\mathbb{R}_*^+.$$

where the indices i, j represent edges connected to the particular node y.

Accordingly, if a node from the fifth set of nodes with no incident edges is included in an optimal path, an overall value of zero is produced in the QUBO sum. If a node from the fifth set of nodes is included in an optimal path and has one incident edge the QUBO sum gives a positive value 2k. If a node from the fifth set of nodes is included in an optimal path and has two incident edges, the QUBO sum gives 2k+2k+4=8k. However, in this case −8k is added from the auxiliary qubit $Q_{i,n+1}$ which produces an overall result of zero (as in the case of zero incident edges). Therefore, two incident edges is energetically equivalent to zero incident edges. For three or more incident edges the QUBO sum result increases, which makes these cases increasingly suboptimal. That is, the auxiliary qubit is utilized when a constraint has two or more possible results. For example, if the auxiliary qubit is in a 1-state, the sum of all qubits related to the node corresponding to the constraint needs to be zero to minimize the QUBO value and if the auxiliary qubit is in a 0-state, the sum of all qubits related to the node needs to be two to minimize the QUBO value.

In the presently described method, the lower triangle of the matrix Q is set to zero. However, the matrix Q could also be defined with the upper triangle of the matrix Q set to zero or as a symmetric matrix using the above described mapped constraints. Further, the values 2k, 4k, 6k, etc. used in the above described mapped constraints can be adjusted or varied, e.g., based on system specific considerations. However, the presented relative values can produce a maximum gap between qubit values which gives a minimum ground energy and a second minimum ground energy. Therefore, adjustments or variations that preserve the relative differences between the values may be preferable.

The system obtains data representing a solution to the cost optimization problem from a quantum computing resource (step 206). The data representing a solution to the cost optimization problem may be data representing a low energy configuration of the states of the qubits associated with the edges of the graph. For example, qubits in the low energy configuration that are in a 1 state can represent edges of the graph that are "on" and therefore appear in the optimal path. Qubits that are in a 0 state can represent edges of the graph that are "off" and not included in the optimal path. Accordingly, the system can extract an optimal path from the data by determining which qubits are in a 1 state and which qubits are in a zero.

In some implementations, the obtained data representing a solution to the cost optimization problem may be presented to a user through a GUI, e.g., a GUI in which the user input data defining the cost optimization problem at step 202. Example GUIs for inputting data defining a cost optimization problem and displaying data representing a solution to the cost optimization problem are described below with reference to FIGS. 3A-3C.

The system initiates an action based on the obtained data representing a solution to the cost optimization problem (step 208). For example, the system can initiate distribution of goods according to a route specified by the solution to the cost optimization problem, e.g., by transmitting data representing a generated optimal path to a navigation system of a transportation vehicle.

In some implementations the system can store generated solutions to a cost optimization problem. For example, the system can store generated optimal paths in a route database. Then, in response to receiving a same data input, the system can retrieve the generated optimal path from the database.

Because of the computational power provided by the quantum computing device, the runtime of example process 200 can be much faster (compared to classical runtimes). Therefore, example process 200 can be performed dynamically in accordance with real time updates to the input data received at step 202. For example, when example process 200 is performed to determine a shortest path for a transportation route, an output optimal path can be constantly recalculated/updated to take into account current conditions, e.g., traffic levels or weather, by providing updated input data at step 202 and recalculating the optimal path using the updated input data. Alternatively or in addition, alternative paths can be easily output and selected.

Figure 3A:
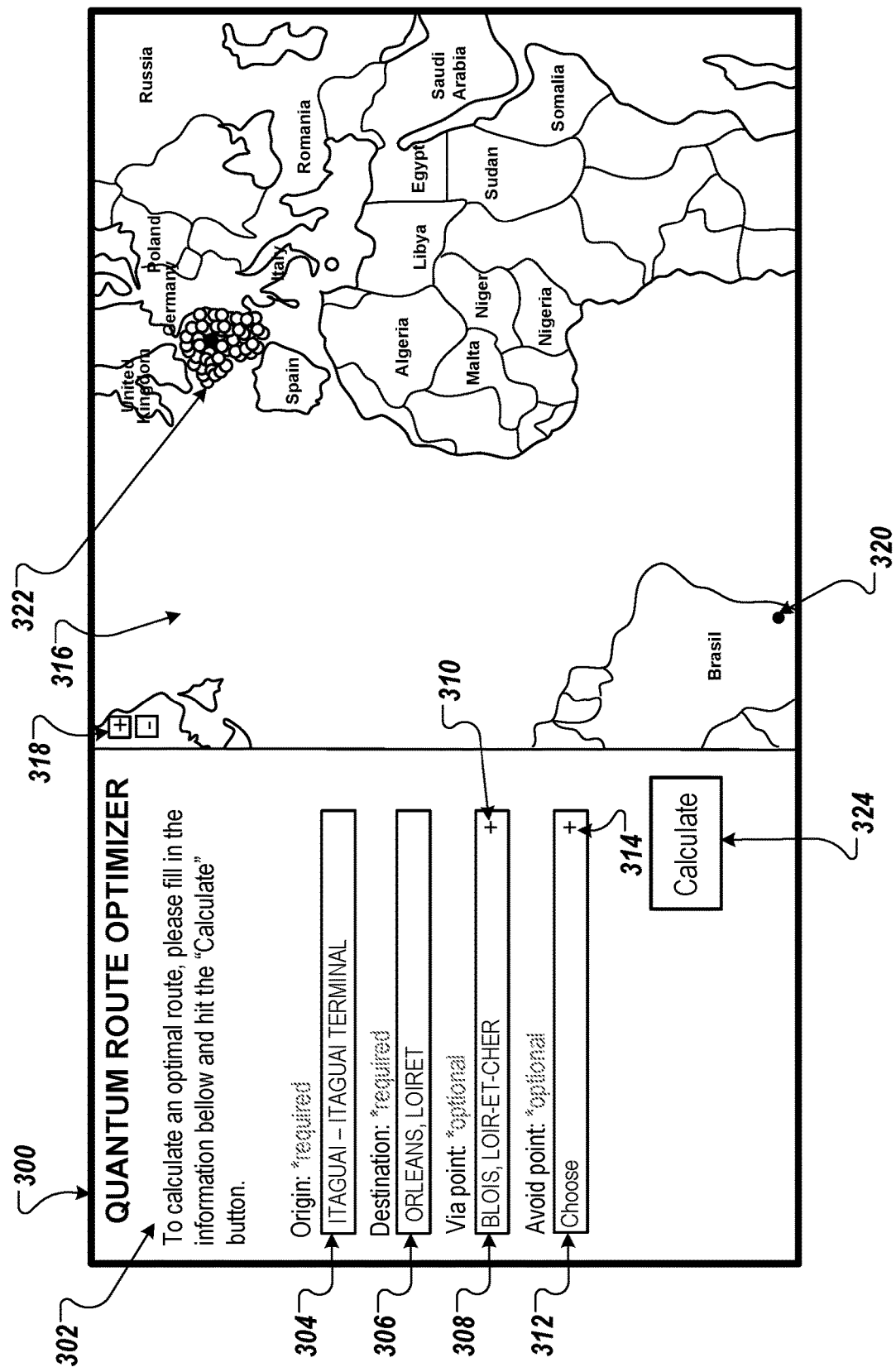
FIGS. 3A-3C show example graphical user interfaces (GUIs) for receiving inputs representing a cost optimization problem and displaying outputs representing solutions to the cost optimization problem.
Figure 3B:
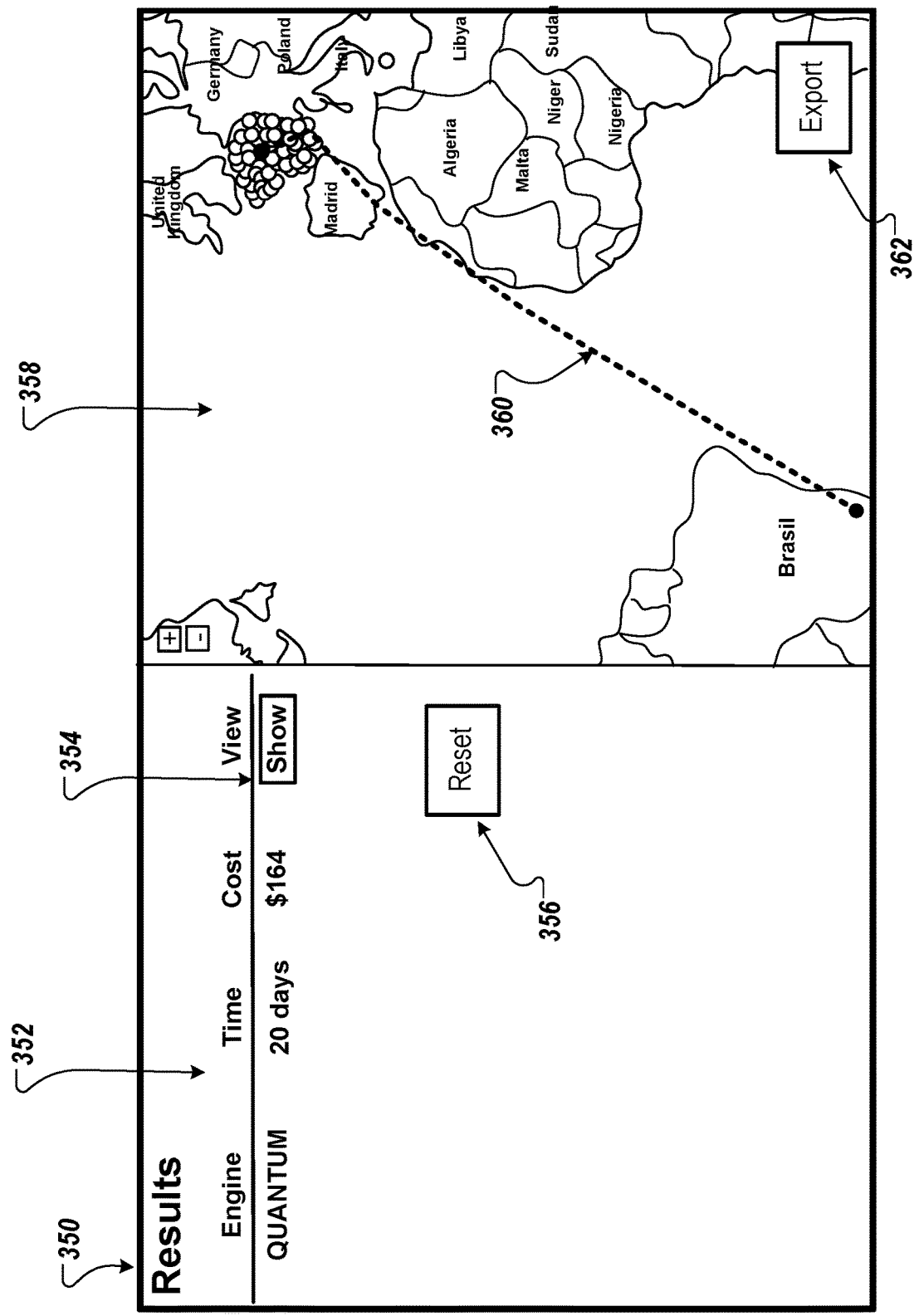
Figure 3C:
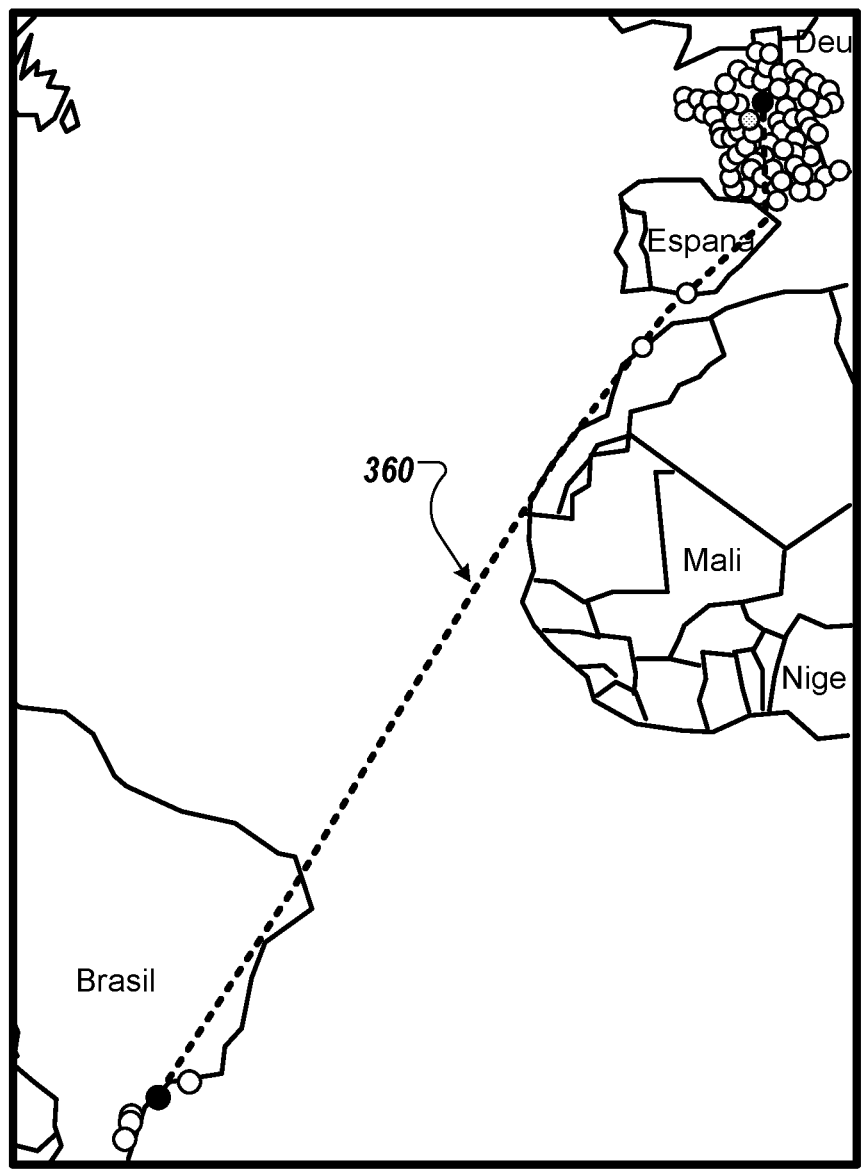

FIGS. 3A-3C show example user interfaces. FIG. 3A shows an example user interface presentation 300 for receiving inputs representing a cost optimization problem, as described above with reference to step 202 of FIG. 2. In particular, example user interface presentation 300 is a user interface that allows a user to provide inputs for calculating a shortest path between multiple physical locations in logistics and freight planning.

A first portion 302 of the example user interface presentation 300 allows a user to specify locations to be included (or excluded) in a path. For example, the first portion 302 includes an input field 304 that allows a user to input a path origin. In some cases a user can enter a location in the input field 304. In other cases the input field 304 may invoke a drop down list that allows a user to select a location from a list of predefined locations. In example user interface 300, the user has typed or selected Itaguai, Brazil as a path origin.

The first portion 302 further includes an input field 306 that allows a user to input a path destination. In some cases a user can enter a location in the input field 306. In other cases the input field 306 may invoke a drop down list that allows a user to select a location from a list of predefined locations. In example user interface 300, the user has typed or selected Orleans, France as a path destination.

The first portion 302 further includes an input field 308 that allows a user to input locations to be included in the path between the origin and destination, i.e., mandatory locations. In some cases a user can enter a location in the input field 308. In other cases the input field 308 may invoke a drop down list that allows a user to select a location from a list of predefined locations. In example user interface 300, the user has typed or selected Blois as a mandatory location. Although not shown in FIG. 3A, the example user interface 300 may also allow a user to specify a measure of how important it is that a mandatory location is included in a path. For example, the example user interface 300 may further include an input field that enables a user to input a score that weights the importance of an input mandatory location.

A user may input multiple locations to be included in the path between the origin and destination by selecting the plus icon 310 and inputting or selecting additional mandatory locations.

The first portion 302 further includes an input field 312 that allows a user to input locations to be excluded in the path between the origin and destination, i.e., prohibited locations. In some cases a user can enter a location in the input field 312. In other cases the input field 312 may invoke a drop down list that allows a user to select a location from a list of predefined locations. Although not shown in FIG. 3A, the example user interface 300 may also allow a user to specify a measure of how important it is that a prohibited location is not included in a path. For example, the example user interface 300 may further include an input field that enables a user to input a score that weights the importance of an input prohibited location. In some cases, inputting a maximum score can cause the location to be labelled as a "removed" location and be excluded from the route calculation completely.

A user may input multiple locations to be excluded in the path between the origin and destination by selecting the plus icon 314 and inputting or selecting additional prohibited locations.

As the user inputs locations in any one of the input fields 304, 306, 308 and 312, the second portion 316 of the user interface presentation 300 can display a map showing the input locations. For example, the second portion 316 can initially (before any locations are input or selected by the user) display a map of the world. The user can adjust the view of the displayed map using the zoom buttons 318. As a user inputs locations, the second portion 316 can display relevant parts of the map and mark the input locations. For example, in example user interface 300 the second portion displays a map that marks the input origin Itaguai and the input destination Orleans using colour coded markings. For example the map may mark the origin with a mark in a first colour, e.g., mark 320, and the destination with a mark in a same or different colour. Although not shown in FIG. 3A, the map may further mandatory locations with green markers and prohibited locations with red markers.

The map can further mark known locations near to input locations. For example, the map shown in second portion 316 marks, e.g., using markers 322, multiple locations near to the destination Orleans and mandatory location Blois. Such markers can assist the user in selecting mandatory or prohibited locations.

Once the user has specified multiple locations to be included or excluded in the path, the user can select the calculate button 324. Selecting the calculate button 324 causes the system to calculate a shortest path between the locations specified by the user using the techniques described above, e.g., with reference to example process 200 of FIG. 2.

FIG. 3B shows an example user interface presentation 350 for displaying outputs representing solutions to the cost optimization problem. In particular, example user interface presentation 350 shows results of processing the inputs provided by the user in response to the user selecting the calculate button shown in example user interface presentation 300 of FIG. 3A.

The example user interface presentation 350 includes a first portion 352 that displays an overview of a calculated shortest path. A user can select the show button 354 to view details of the calculated shortest path. For example, in response to a user selecting the show button 354 another user interface presentation that shows the route in detailed for, e.g., as a list with address information and distances between locations, may be displayed. If a user determines that the time or cost of the calculated path is too long or too costly, the user can select the reset button 356 to return to example user interface presentation 300 of FIG. 3A and input different location information to reduce the time or cost.

The example user interface presentation 350 further includes a second portion 358 that displays a map showing an overview of the calculated path, e.g., calculated path 360. A user can zoom in and out of the map to view more details of the calculated path, e.g., exact roads to take. FIG. 3C shows an example zoomed in version of the calculated path 360.

Returning to FIG. 3B, the second portion 362 further includes an export button 362. For example, in response to a user selecting the export button 362, the calculated route can be exported for implementation, e.g., in an app or navigation device.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

Elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining, from a quantum computing resource, data representing a solution to a cost optimization problem;
   receiving updated input data for the cost optimization problem;
   generating a data representation of an updated cost optimization problem based on the updated input data;
   converting the data representation of the updated cost optimization problem from a format that is associated with a classical computing resource into a format that is associated with a quantum computing resource, comprising mapping the data representation of the updated cost optimization problem to a quadratic unconstrained binary optimization (QUBO) formulation of the updated cost optimization problem, the QUBO formulation comprising multiple variables with values determined by states of respective qubits; and
   obtaining, from the quantum computing resource, data representing a solution to the updated cost optimization problem.

2. The method of claim 1, wherein the cost optimization problem comprises a shortest path problem.

3. The method of claim 2, wherein
   the data representing a solution to the cost optimization problem comprises data representing a low energy configuration of states of the qubits,
   the low energy configuration of the states of the qubits represents a low cost path, and
   the low energy configuration of the states of the qubits comprise qubits in a 1 state and qubits in a 0 state, wherein the low cost path comprises edges corresponding to the qubits in a 1 state.

4. The method of claim 1, wherein the cost optimization problem comprises a problem of determining a shortest path between multiple physical locations and the method further comprises initiating distribution of goods according to a route specified by the solution to the updated cost optimization problem.

5. The method of claim 4, wherein the updated input data comprises data specifying one or more of: current weather conditions at one or more of the multiple physical locations; current levels of traffic at one or more of the multiple physical locations, current border, road, sea lane or flight path closures at one or more of the multiple physical locations.

6. The method of claim 1, wherein
   the cost optimization problem comprises a cost optimization problem in a network, wherein the network is represented as a graph of nodes and edges, wherein each qubit corresponds to a respective edge of the graph of nodes and edges; and
   each edge comprises an associated cost, wherein the cost optimization problem comprises determining a path between an initial node and an end node in the graph such that a sum of the associated costs of the constituent edges is minimized,
   wherein the updated cost optimization problem comprises a first constraint for the updated cost optimization, wherein the first constraint specifies that, in a determined path, both an initial node and an end node comprise one incident edge.

7. The method of claim 6, wherein the QUBO formulation of the updated cost optimization problem further comprises a Hamiltonian function represented by a matrix, and wherein mapping the data representation of the updated cost optimization problem to a QUBO formulation of the updated cost optimization problem comprises mapping the first constraint to the Hamiltonian function represented by a matrix, comprising, for each of the initial node and the end node:
   identifying edges in the graph that are connected to the node;
   populating entries of the matrix that correspond to the identified edges, the populating comprising:
   adding $-2k$ to diagonal entries of the matrix that correspond to the identified edges, wherein k represents a positive real number;
   adding $4k$ to upper diagonal entries of the matrix that correspond to pairs of the identified edges; and
   adding zero to lower diagonal entries of the matrix.

8. The method of claim 6, wherein the updated cost optimization problem comprises a second constraint for the updated cost optimization, wherein the second constraint i) specifies that, in a determined path, each mandatory node for the path comprises two incident edges, and ii) penalizes candidate paths that do not include mandatory nodes.

9. The method of claim 8, wherein the QUBO formulation of the updated cost optimization problem further comprises a Hamiltonian function represented by a matrix, and wherein mapping the data representation of the updated cost optimization problem to a QUBO formulation of the updated cost optimization problem comprises mapping the second constraint to the Hamiltonian function represented by a matrix, comprising, for each mandatory node:
   identifying edges in the graph that are connected to the node;
   populating entries of the matrix that correspond to the identified edges, the populating comprising:
   adding $-6k$ to diagonal entries of the matrix that correspond to the identified edges, where k represents a positive real number;
   adding $4k$ to upper diagonal entries of the matrix that correspond to pairs of the identified edges; and
   adding zero to lower diagonal entries of the matrix.

10. The method of claim 6, wherein the updated cost optimization problem comprises a third constraint for the updated cost optimization, wherein the third constraint i) specifies that, in a determined path, each prohibited node for the path comprises zero incident edges, and ii) penalizes candidate paths that include prohibited nodes.

11. The method of claim 10, wherein the QUBO formulation of the updated cost optimization problem further comprises a Hamiltonian function represented by a matrix, and wherein mapping the data representation of the updated cost optimization problem to a QUBO formulation of the updated cost optimization problem comprises mapping the third constraint to the Hamiltonian function represented by a matrix, comprising, for each prohibited node:
  identifying edges in the graph that are connected to the node;
  populating entries of the matrix that correspond to the identified edges, the populating comprising:
    adding 2k to diagonal entries of the matrix that correspond to the identified edges, where k represents a positive real number; and
    adding zero to other entries of the matrix.

12. The method of claim 6, wherein the updated cost optimization problem comprises a fourth constraint for the updated cost optimization, wherein the fourth constraint removes nodes from the graph.

13. The method of claim 6, wherein the updated input data representing a cost optimization problem in a network comprises one or more of:
  a first updated set of nodes, wherein the first updated set of nodes comprises an updated initial node for the path or an updated end node for the path,
  a second updated set of nodes, wherein the second updated set of nodes comprises updated mandatory nodes for the path,
  a third updated set of nodes, wherein the third updated set of nodes comprise updated prohibited nodes for the path, and
  a fourth updated set of nodes, wherein the fourth updated set of nodes comprise updated nodes to be removed from the graph,
  wherein the updated cost optimization problem comprises a fifth constraint for the updated cost optimization, wherein the fifth constraint specifies that, in a determined path, each node in a fifth set of nodes comprising a complement of a union of the first, second, third and fourth sets of nodes comprises zero or two incident edges.

14. The method of claim 13, wherein the QUBO formulation of the updated cost optimization problem further comprises a Hamiltonian function represented by a matrix, and wherein mapping the data representation of the updated cost optimization problem to a QUBO formulation of the updated cost optimization problem comprises:
  introducing an additional auxiliary qubit;
  mapping the fifth constraint to the Hamiltonian function represented by a matrix, comprising, for each node in the fifth set of nodes:
    identifying edges in the graph that are connected to the node;
    populating entries of the matrix that correspond to the identified edges, the populating comprising:
      adding 2k to diagonal entries of the matrix that correspond to the identified edges, where k represents a positive real number,
      adding 4k to upper diagonal entries of the matrix that correspond to pairs of the identified edges,
      adding zero to lower diagonal entries of the matrix;
      adding 8k to a diagonal entry of the matrix that corresponds to the auxiliary qubit; and
      adding −8k to entries in a column and row corresponding to the auxiliary qubit and the identified edges.

15. One or more non-transitory computer-readable media having instructions stored thereon that, when executed by one or more processors, cause performance of operations comprising:
  obtaining, from a quantum computing resource, data representing a solution to a cost optimization problem;
  receiving updated input data for the cost optimization problem;
  generating a data representation of an updated cost optimization problem based on the updated input data;
  converting the data representation of the updated cost optimization problem from a format that is associated with a classical computing resource into a format that is associated with a quantum computing resource, comprising mapping the data representation of the updated cost optimization problem to a quadratic unconstrained binary optimization (QUBO) formulation of the updated cost optimization problem, the QUBO formulation comprising multiple variables with values determined by states of respective qubits; and
  obtaining, from the quantum computing resource, data representing a solution to the updated cost optimization problem.

16. The non-transitory computer-readable media of claim 15, wherein the cost optimization problem comprises a shortest path problem.

17. The non-transitory computer-readable media of claim 15, wherein the cost optimization problem comprises a problem of determining a shortest path between multiple physical locations and the operations further comprise initiating distribution of goods according to a route specified by the solution to the updated cost optimization problem.

18. A system comprising:
  a classical processor;
  a quantum computing device in data communication with the classical processor;
  wherein the classical processor and quantum computing device are configured to perform operations comprising:
    obtaining, from a quantum computing device, data representing a solution to a cost optimization problem;
    receiving updated input data for the cost optimization problem;
    generating a data representation of an updated cost optimization problem based on the updated input data;
    converting the data representation of the updated cost optimization problem from a format that is associated with a classical computing resource into a format that is associated with a quantum computing resource, comprising mapping the data representation of the updated cost optimization problem to a quadratic unconstrained binary optimization (QUBO) formulation of the updated cost optimization problem, the QUBO formulation comprising multiple variables with values determined by states of respective qubits; and
    obtaining, from the quantum computing device, data representing a solution to the updated cost optimization problem.

19. The system of claim 18, wherein the cost optimization problem comprises a shortest path problem.

20. The system of claim 18, wherein the cost optimization problem comprises a problem of determining a shortest path between multiple physical locations and the operations further comprise initiating distribution of goods according to a route specified by the solution to the updated cost optimization problem.

* * * * *